March 10, 1953 B. W. SEWELL 2,630,618
SEISMOGRAPH CABLE HANDLER
Filed Jan. 20, 1951 3 Sheets-Sheet 2

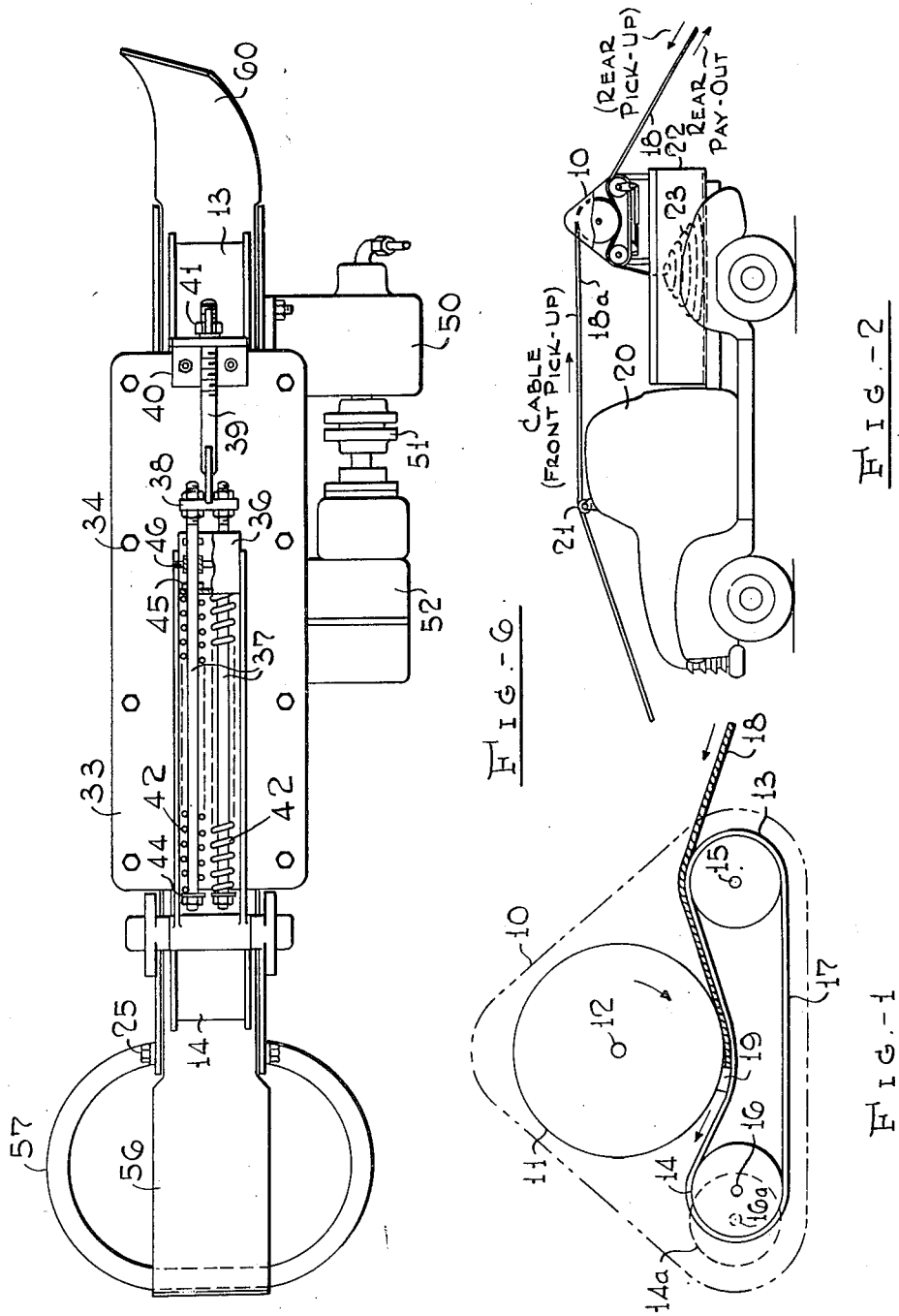

Ben. W. Sewell  Inventor
By W. O. Teilman  attorney

March 10, 1953 B. W. SEWELL 2,630,618
SEISMOGRAPH CABLE HANDLER
Filed Jan. 20, 1951 3 Sheets-Sheet 3
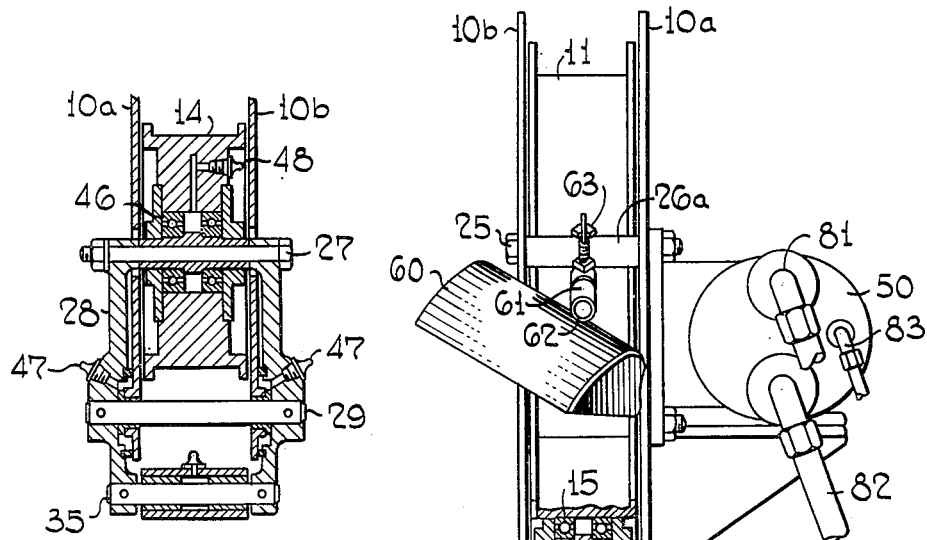
FIG.-4
FIG.-5
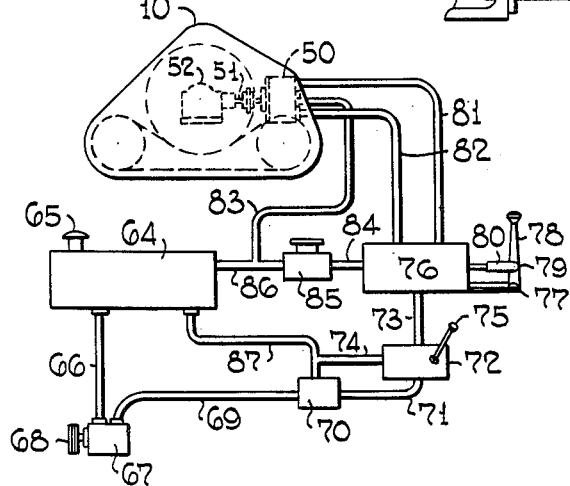
FIG.-7
Ben W. Sewell Inventor
By W. O. J. Heilman Attorney Patented Mar. 10, 1953

2,630,618

UNITED STATES PATENT OFFICE 2,630,618

SEISMOGRAPH CABLE HANDLER

Ben W. Sewell, Tulsa, Okla., assignor to Standard Oil Development Company, a corporation of Delaware Application January 20, 1951, Serial No. 207,009

4 Claims. (Cl. 28—71.5)

This invention is concerned with an improved apparatus for handling the geophone cable used in seismic prospecting. More particularly the invention provides a device that may be mounted on a truck and operated to pick up seismograph cable or similar cable, hose, or the like and deposit it in a random pile in the truck as well as to pay out cable from the truck and lay it on the ground. The invention also involves improved methods for the handling of seismograph cable.

In seismic prospecting the depth and probable nature of geological strata beneath the earth's surface are ascertained by initiating a seismic shock at a selected point at or near the earth's surface, the resulting motion of the earth from seismic waves initiated by the seismic disturbance being detected at a number of points on the earth's surface by means of sensitive pickups, known as geophones or seismometers, which translate the detected wave motion into electrical impulses which after suitable amplification can be recorded on a seismograph. From the arrival times of the various reflected waves determined from the seismograph as well as from related data obtained in the area being studied, such as seismic wave velocities in the various earth layers, it is then possible to estimate the depths of the various reflecting substrata. Usually the seismic disturbance is produced by detonation of an explosive shot placed on the ground, in a shot hole, or above the surface of the ground and adjacent thereto. It is common practice to place the geophones in line with the shot point and to space them more or less evenly from each other and from the shot point. A suitable multiconductor cable is provided through which the individual geophones can be connected to a recording station, usually a field truck, provided with seismograph instruments.

When running a seismic survey it is of course necessary to pick up the seismograph cable and move it each time the locations of shot hole and geophone spread are changed. In this connection many difficulties have been experienced with the present day mechanical cable reels on which the seismograph cable is wound for the purpose of transporting it to a desired location. One of the major objectionable features is that such equipment is very heavy and is expensive to manufacture and install on the truck. Another objection is that since the spooling of the cable on the reel must be done manually, constant attention of the operator is required. Furthermore, if the cable should become snagged the inertia of the reel will cause damage to the cable. The cable also tends to become damaged because of the stresses set up in winding the cable on the relatively small diameter of the barrel of the reel. The present invention is concerned with an improved cable handling device that overcomes these difficulties.

One object of this invention is to provide a cable handling mechanism that will reel in and pay out cable with a minimum of damage to the cable and at the same time minimize or eliminate manual handling of the cable. Another object is to provide an improved method of handling seismograph cable.

Briefly this invention comprises use of a mechanism consisting of three flanged pulleys, one of larger diameter than the other two, and a flat belt which is wrapped around the two small pulleys and contacts the working face of the larger pulley in a region intermediate the two small pulleys. Preferably the region of contact between the larger pulley and the belt extends over an arc of about 50 to 70 degrees on the circumference of the large diameter pulley. By inserting the cable between the belt and the large pulley and by rotating the latter pulley in the proper direction the cable can be drawn through the device and deposited in the bed of the truck in a random pile or can be picked up from the random pile and paid out of the truck onto the ground. Extensive tests have proven conclusively that a seismograph cable handled in this manner will not become entangled if it is allowed to fall freely into a random pile. By eliminating the small diameter flexing that occurs when usual practice of winding the cable on a reel is used, wear and tear on the cable is minimized.

Damage to the cable or to the cable handling unit is also minimized by having one of the smaller pulleys properly spring loaded to permit objects of larger diameter than the cable, such as take-out plugs and loops to pass through the device.

The nature and objects of this invention will be more clearly understood from the ensuing description when taken in conjunction with the drawings in which:

Figure 1 is a schematic diagram showing the principle of operation of the device of this invention;

Figure 2 is a schematic diagram showing the preferred manner of mounting the device of this invention on the rear of a truck to provide for reeling in cable from either the front or the back of the truck;

Figure 4 is a vertical sectional side view taken along line IV—IV of Fig. 3;

Figure 5 is a vertical side view, partly in section, taken in the direction of line V—V of Fig. 3;

Figure 6 is a bottom view of the device, with portions in section; and

Figure 7 is a schematic flow diagram of the hydraulic system for operating the cable handling mechanism.

Figure 3:
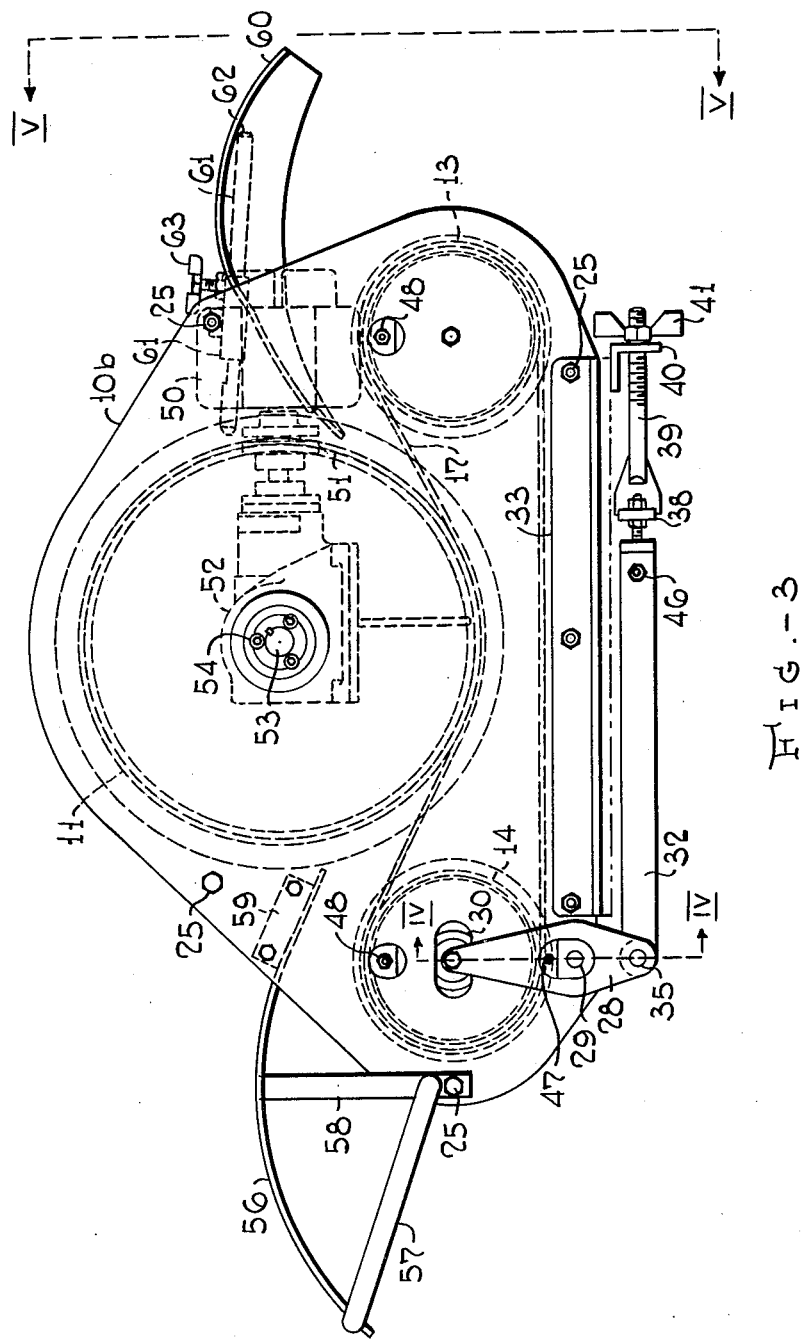
Figure 3 is a side elevational view of one embodiment of the device.

Referring particularly to Figure 1, it will be seen that the device consists essentially of an assembly of three pulleys positioned within a suitable housing 10, one of the pulleys 11 being preferably of larger diameter than the other two pulleys 13 and 14. The pulleys are supported on suitable bearings 12, 15 and 16, the latter being adapted for limited tensional movement. A flat belt 17 preferably of the same width as the working face of the pulleys is wrapped around the two small pulleys 13 and 14 so that it makes an arc of contact of approximately 50 to 70 degrees with the large pulley 11.

Thus when a cable 18 is inserted between the large pulley 11 and the flat belt 17 rotation of the large pulley in the proper direction pulls the cable through by friction. By providing for limited lateral movement of bearing 16 supporting the pulley 14 as mentioned above, the device is able to handle plugs and take-outs 19 which are larger than the cable itself without injury to either the plugs or the mechanism. The limits of travel of bearing 16 and pulley 14 are illustrated diagrammatically by the numerals 14 and 14a and 16 and 16a.

The manner of mounting the device on a truck to provide for reeling the cable from either the front or the back of the truck is shown schematically in Figure 2. For picking up from the rear, the cable is merely pulled in between the flat belt and the large pulley 11 as described in connection with Figure 1 and laid in a random pile 23 on the bed of the truck 22. For front pickup of the cable a small pulley 21 is fastened to the cab of the truck 20 and the cable 18a passes over the small pulley 21 and then over the large pulley 11 and between the large pulley and the flat belt as already described.

A specific embodiment of the invention is illustrated in Figures 3, 4, 5 and 6, Figure 3 being a side elevational view, Figure 4 being a vertical sectional view taken along line IV—IV of Figure 3, Figure 5 being a vertical side view partly in section taken in the direction of line V—V of Figure 3 and Figure 6 being a bottom view with portions in section. The housing for the device consists of two large flat plates 10a and 10b of suitable shape held in spaced parallel relation by a plurality of spacers 26 through which are inserted nut and bolt assemblies 25. A large diameter flanged pulley 11 is suitably supported between the plates of the housing as shown and two smaller diameter flanged pulleys 13 and 14 are similarly placed and are held by bearings 15 and 16. Bearing 16 is carried by rod 27 on lever arm 28, which is pivotally supported on bearing 29. A slot 30 in each of the plates 10a and 10b permits limited lateral movement of bearing 16. A flat belt 17, preferably made of multiple ply rubber and fabric, is wrapped around the small pulleys in the manner described in connection with Figure 1. Lubrication of bearings 29 and 15 and 16 is provided for by grease fittings 47 and 48.

Angle plates 33 are conveniently attached to the bottom portion of each of the side plates 10a and 10b to furnish a suitable means for mounting the device on a truck, holes 34 being provided in the bottoms of these plates to receive bolts for this purpose.

To provide proper tension in belt 17 a spring loaded mechanism is employed in connection with lever arm 28. This mechanism, which is shown in Figures 3 and 6, consists of a tension yoke 32 pivotally fastened to the lower end of lever arm 28 by bearing 35, the yoke being fastened to a block 36 which is slidably mounted on a pair of rods 37. The latter rods are fastened to a cross head 38 which in turn is fastened to threaded rod 39 held by a bracket 40 which is attached to angle plates 33, the rod passing through a suitable opening in the bracket. A pair of compression springs 42 are fitted onto rods 37 and are held in compression between block 36 and a nut and washer assembly 44 on the end of each of the rods 37. To minimize wear, a grease fitting 46 is inserted in block 36 for lubrication and felt seals 45 are placed at each end of the block to keep out dirt. Tension in the springs 42 is adjusted by means of a wing nut 41 on the end of threaded rod 39. Obviously in place of the pair of rods 37 and springs 42 a single rod and spring assembly could be employed, although for proper tension in the minimum amount of space the design illustrated is preferred.

For maximum utility of the cable handling device it is preferable to provide deflectors at each end of the device to direct the cable in a desired direction. For example, deflector 56 supported by braces 57 and 58 and bracket 59 may be fastened to one end of the device to direct the cable into the bed of the truck. Likewise, deflector 60 may be fastened to the other end of the device to direct the cable to a selected side of the road as it is being paid out while the truck is traveling along the road. Deflector 60 is preferably mounted on a sleeve bracket 61 so that it can be readily removed when desired, bracket 61 sliding onto rod 62 which in turn is attached to spacer 26a. Wing nut 63 holds brackets 61 firmly in place on rod 62.

It is preferred that motive power for the device be furnished through a hydraulic drive mechanism since this makes for maximum flexibility in operation and at the same time contributes a factor of safety in that if by accident the operator should get his hand caught between the large pulley and the belt no serious injury would result, because the hydraulic motor would stall.

In the embodiment depicted in Figs. 3 to 6 a hydraulic motor 50 mounted on the side of the device and is coupled through unit 51 to a gear box 52 also mounted on the side of the device. Pulley 11 is mounted on the driving shaft 53 of gear box 52 and is held in place by bolts 54. Hydraulic fluid is pumped into the motor through lines 81 and 82 as will hereinafter be explained.

A schematic flow diagram of the hydraulic system for operating the cable handling mechanism is shown in Fig. 7. Hydraulic fluid for the system is stored in reservoir 64 and is fed into a hydraulic pump 67 through line 66. An oil filler cap 65 fitted into the reservoir may be employed to act as a breather and air filter and also to filter any additional hydraulic fluid that is added to the reservoir. Power for pump 67 is obtained through coupling 68 which may be coupled to a power take-off on the truck or to a suitable pulley such as a V-belt pulley. Hydraulic fluid is pumped through line 69, pressure relief valve 70 and line 71 into a volume control valve 72 and from thence through line 73 into a directional control valve 76. Directional control valve 76 is what is known as a four-way control valve having three operating positions. Such valves are available commercially and thus need not be shown here structurally but may be described functionally by the three operating positions. For example, a Vickers C-430-C-NS valve may be used. Such a valve is described in Catalog 4900 of Vickers, Incorporated, page 27.

In one operating position of the valve the flow is directed through line 81 and the return line 82 is connected with outlet line 84. In a second position flow is directed outwardly through line 82, in which case line 81 acts as the return line and is connected to outlet line 84. In a third or neutral position flow is directed from inlet line 73 to outlet line 84. Adjustment to one of these three positions is made by means of handle 78 which is pivotally attached to platform 77 fastened to the base of the valve. The plunger of the valve is attached to handle 78 through plunger linkage 80 which is pivotally attached to handle 78 at point 79. Detents in the valve plunger rod keep the handle in a selected position. Thus it will be seen that handle 78 may be set in one position to direct hydraulic flow through motor 50 in a forward direction, in a second position to direct flow through the motor in a reverse direction, or to a neutral position wherein no flow occurs through the motor. Preferably a filter 85 is inserted in flow line 84 to ensure that the fluid will be kept free of foreign matter which might damage the pump motor or valves. The filtered fluid returns to the reservoir 64 through line 86. Preferably a drain line 83 is also provided from the motor to the reservoir. In operating the hydraulic system the speed of the motor is controlled by volume control valve 72 through a control handle 75 and the direction of motor operation is controlled through valve 76 as described. Excess pressure built up by operation of valve 72 is bled back from pressure relief valve through line 87. Excess fluid not directed through line 73 by valve 72 returns to the reservoir through lines 74 and 87.

It is to be understood that the embodiments of the invention described herein are by way of example and are not intended to limit the invention, whose proper scope is defined in the appended claims.

What is claimed is:

1. A device adapted to reel in cable and place it in a random pile and to pay out cable from a random pile comprising a supporting frame including two flat plates of selected shape supported in substantially parallel planes and defining a space between them, a pair of flanged pulleys rotatably supported in spaced relation within said defined space, an endless flat belt passing around said two pulleys, a third flanged pulley rotatably supported within said confined space with its working face contacting the exterior side of said belt in a region intermediate said first two pulleys, adjustable tension means controlling limited movement of said first two pulleys toward and away from each other within said defined space, and drive means for one of said three pulleys.

2. Device as defined by claim 1 wherein said third pulley is of substantially larger diameter than either of the first named pulleys and where in said region of contact between said third pulley and said belt extends over an arc of about 50 to 70 degrees.

3. Device as defined by claim 1 including at least one curved deflector plate detachably supported by said frame adjacent at least one of said first named pulleys whereby to direct the cable in a selected direction away from said device as it passes between said belt and said third pulley.

4. A device adapted to reel in cable and place it in a random pile and to pay out cable from a random pile comprising a supporting frame, a pair of pulleys rotatably supported by said frame with their planes of rotation substantially coincident, an endless flat belt passing around the pulleys, a third pulley lying in substantially the same plane as said first two pulleys in such relation thereto that its working face contacts said belt in a region intermediate said first two pulleys, adjustable tension means controlling the pressure of said belt on said third pulley, drive means for one of said pulleys, and at least one curved deflector plate detachably supported by said frame adjacent one of said first named pulleys whereby to direct the cable in a selected direction away from said device as it passes between said belt and said third pulley.

BEN W. SEWELL.

REFERENCES CITED

The following references are of record in the file of this patent:

UNITED STATES PATENTS

| Number | Name | Date |
| --- | --- | --- |
| 2,369,089 | Thomas | Feb. 6, 1945 |
| 2,497,511 | Neisler, Jr. | Feb. 14, 1950 |
| 2,516,383 | Hays | July 25, 1950 |